US011821808B2

United States Patent
Cote et al.

(10) Patent No.: US 11,821,808 B2
(45) Date of Patent: Nov. 21, 2023

(54) SIGNATURE RECOGNITION ON OPTICAL-FIBER CONNECTOR ENDFACES

(71) Applicant: EXFO Inc., Quebec (CA)

(72) Inventors: Olivier Cote, Quebec (CA); Nicolas Caron, Quebec (CA); Mario L'Heureux, Levis (CA); Robert Baribault, Quebec (CA)

(73) Assignee: EXFO Inc., Quebec (CA)

( * ) Notice: Subject to any disclaimer, the term of this patent is extended or adjusted under 35 U.S.C. 154(b) by 590 days.

(21) Appl. No.: 16/944,853

(22) Filed: Jul. 31, 2020

(65) Prior Publication Data
US 2021/0063274 A1 Mar. 4, 2021

Related U.S. Application Data

(60) Provisional application No. 62/894,080, filed on Aug. 30, 2019.

(51) Int. Cl.
*G06T 7/62* (2017.01)
*G01M 11/00* (2006.01)
*G06T 7/00* (2017.01)

(52) U.S. Cl.
CPC .... *G01M 11/3145* (2013.01); *G01M 11/3136* (2013.01); *G06T 7/0004* (2013.01); *G06T 7/62* (2017.01); *G06T 2207/10056* (2013.01); *G06T 2207/30108* (2013.01)

(58) Field of Classification Search
CPC . G01M 11/3145; G01M 11/3136; G06T 7/62; G06T 7/0004; G06T 2207/10056
See application file for complete search history.

(56) References Cited

U.S. PATENT DOCUMENTS

| | | | |
|---|---|---|---|
| 5,179,419 A | 1/1993 | Palmquist et al. |
| 5,809,162 A | 9/1998 | Csipkes et al. |
| 6,751,017 B2 | 6/2004 | Cassady |
| 6,879,439 B2 | 4/2005 | Cassady |
| 7,232,262 B2 | 6/2007 | Lytle et al. |

(Continued)

FOREIGN PATENT DOCUMENTS

WO 2012177821 A1 12/2012

OTHER PUBLICATIONS

Vikran et al., Various Image Matching Algorithms, Imperial Journal of Interdisciplinary Research (IJIR), vol. 3, Issue-2, 2017, ISSN: 2454-1362, http://www.onlinejournal.in.

(Continued)

*Primary Examiner* — Myron Wyche
(74) *Attorney, Agent, or Firm* — Helene Chotard

(57) ABSTRACT

There is therefore provided a method, system and computer program for detecting duplicate optical-fiber connector endface inspections performed on a same optical-fiber connector. Duplicate optical-fiber connector endface inspections can be detected by extracting a signature of the optical-fiber connector endface from the acquired optical-fiber connector endface inspection image to uniquely identify the optical-fiber connector and detect duplicate optical-fiber connector endface inspections. The signature can be stored to help detection of inadvertent or fraudulent duplicate or repetitive measurements made on a same optical-fiber connector.

23 Claims, 15 Drawing Sheets

(56) References Cited

U.S. PATENT DOCUMENTS

| | | | | |
|---|---|---|---|---|
| 2014/0125798 A1* | 5/2014 | Thompson | ............. | G01N 21/94 |
| | | | | 348/130 |
| 2015/0278639 A1* | 10/2015 | Leighton | ................. | G02B 6/02 |
| | | | | 382/203 |
| 2017/0176692 A1* | 6/2017 | Gregorski | ............ | G02B 6/3834 |

OTHER PUBLICATIONS

JDSU, A Quick Start Guide to Fiber Inspection Cleaning, and Test—Inspect Before You Connect, 2009.

* cited by examiner

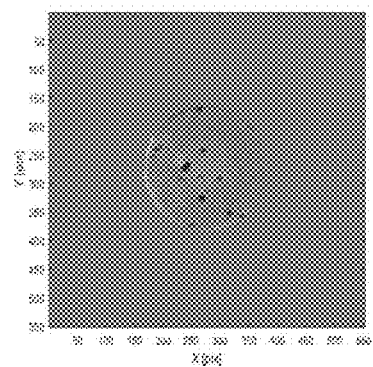 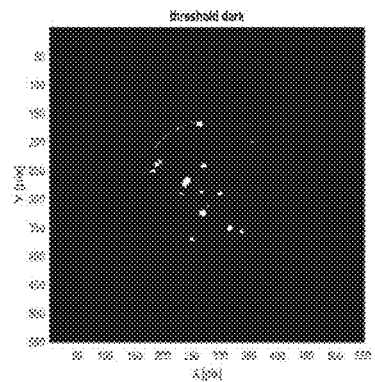 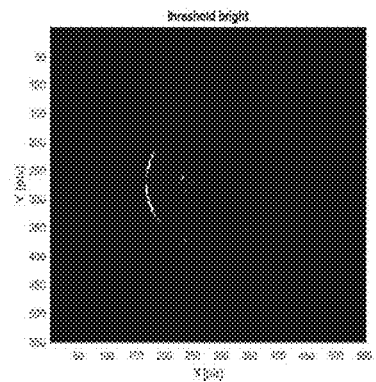
Fig. 7A     Fig. 7B     Fig. 7C
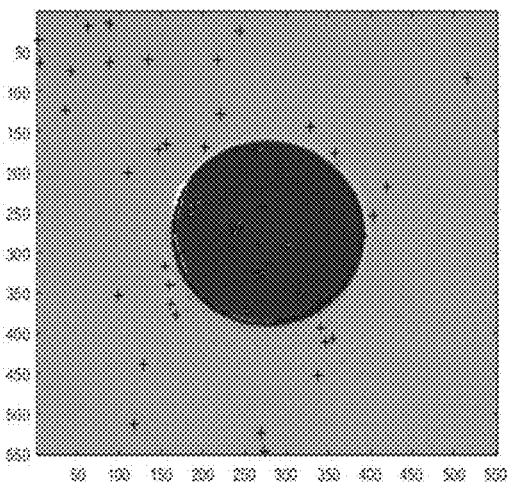
Fig. 8

SIGNATURE RECOGNITION ON OPTICAL-FIBER CONNECTOR ENDFACES

TECHNICAL FIELD

The present description generally relates to optical-fiber connector endface inspection, and more particularly, to analysis of optical-fiber connector endface inspection images.

BACKGROUND

The quality and cleanliness of endfaces of optical-fiber connectors represent important factors for achieving expected system performance of optical communication networks. Indeed, any contamination of or damage on the mating surface of an optical-fiber connector may severely degrade signal integrity. Optical-fiber connector endface inspection microscopes (also known as fiber inspection probes) are commonly employed to inspect the endface of an optical-fiber connector at installation or during maintenance of optical communication networks, in order to verify the quality of the optical-fiber connection.

Communication network operators often subcontract installation, repair and testing of their optical fiber network. These tasks can also be accomplished by network operators' employees. Typically, a test job includes the characterization of many optical fibers and optical fiber connectors and a single test job may comprise the characterization of hundreds of individual optical fibers and optical fiber connectors. A test report may be prepared by the employee or subcontractor and submitted to the network operator. In the context of installation or repair, the test report may further be required to complete a job and release payment to a subcontractor.

A test job may include, e.g., the endface inspection of optical-fiber connectors using an optical-fiber connector endface inspection microscope and/or OTDR measurements carried towards each individual fiber.

Testing many fibers can take a long time and connecting to each individual fiber connector requires manipulation, including cleaning. Furthermore, measurement results that do not comply with the network operator acceptance criteria (e.g. PASS/FAIL thresholds) may involve extra manipulation to further clean or repair a noncompliant connector for example. Therefore, in order to save time and money, temptation can be high to cheat by repeating an optical-fiber connector endface inspection on the same optical fiber and pretend that the inspection was performed on different optical fibers.

Cheating employees or subcontractors would look for a compliant optical-fiber connector (i.e. qualified as good or acceptable) and then remain on this connector while pretending to connect to the next one before launching a new optical-fiber connector endface inspection. Of course, inspections will be repeated on compliant connectors and, consequently, connectors that might have failed the test can go undetected.

Although duplication of test data files can be easily detected by auditing the test report (from metadata), such audition will not detect repeated inspection over a same optical-fiber connector but saved in different data files.

Of course, although cheating is more tempting on a large number of fibers to be tested, it can also be present on small numbers and duplicate optical-fiber connector endface inspections can also be inadvertent.

There therefore remains a need for detecting inadvertent or fraudulent duplicate optical-fiber connector endface inspections performed on a same optical-fiber connector.

SUMMARY

There is therefore provided a method, system and computer program for detecting duplicate optical-fiber connector endface inspections performed on a same optical-fiber connector. Duplicate optical-fiber connector endface inspections can be detected by extracting a signature of the optical-fiber connector endface from the acquired optical-fiber connector endface inspection image to uniquely identify the optical-fiber connector and detect duplicate optical-fiber connector endface inspections. The signature can be stored to help detection of inadvertent or fraudulent duplicate or repetitive measurements made on a same optical-fiber connector.

Each optical-fiber connector endface is likely to present some dirt, some scratches, or some anomalies creating image features that are unique to a given optical-fiber connector and could be used to detect images acquired on a same optical-fiber connector. However, fraudulent duplicates are more likely to occur on clean optical-fiber connectors presenting few or even none of these features, which makes duplicate detection more difficult.

Optical-fiber connectors are constructed by inserting an optical fiber within a ferrule. The optical fiber is usually fixed within the ferrule using an adhesive. The portion of an optical-fiber connector endface inspection image corresponding to the interface between the optical fiber and the ferrule, including any gap, contact zone and/or adhesive, i.e., the circumferential area of the optical fiber, is also referred to herein as the "rim" zone. The adhesive distribution is not typically uniform and remains visible after the optical-fiber connector is polished. The presence of gaps and/or adhesive in the rim zone is not considered as a defect of optical-fiber connectors. Therefore, in optical-fiber connector endface inspection, the rim zone is typically disregarded for assessing the cleanliness and quality of optical-fiber connector endfaces.

It was discovered that the adhesive and gaps within the rim zone actually create a unique signature of the optical-fiber connector endface. It creates a detectable pattern that can be used as a unique signature to compare images and detect duplicates.

Therefore, in some implementations, the signature comprises a rim profile of the optical-fiber connector endface that is extracted from the acquired optical-fiber connector endface inspection image. The extracted rim profile can be compared to previously extracted and stored rim profiles, e.g., using a correlation or another algorithm. The extracted rim profiles can be made one-dimensional (e.g., as a function of the angular coordinate), which have the advantage of making rim profile comparison easy, irrespective of the rotational orientation of the optical-fiber connector within the optical-fiber connector endface inspection images.

In some other implementations, the signature comprises image features on the optical-fiber connector endface, which are extracted from the acquired optical-fiber connector endface inspection image. Image features as extracted from a first inspection image can be matched with image features extracted from a second inspection image and the likelihood of the two inspection images being acquired over the same optical-fiber connector can be determined by comparing characteristics of the image features to determine a similarity between matched image features.

In accordance with one aspect, there is provided a method for detecting if inspection images of optical-fiber connector endfaces are acquired on a same optical-fiber connector, the method comprising:

receiving a first inspection image and a second inspection image;

extracting a first rim profile from said first inspection image and a second rim profile from said second inspection image, the first and second rim profiles being each extracted from a portion of the first and second inspection images that corresponds to a circumferential area of an optical fiber within the first and second inspection images; and determining if the first and second inspection images are likely to have been acquired over the same optical-fiber connector at least from a comparison of the first and second rim profiles.

In some embodiments, the method further comprises: activating a flag associated with the inspection images when said first and second inspection images are likely to have been acquired over the same optical-fiber connector.

In some embodiments, the first and the second rim profiles as extracted are one-dimensional functions.

In some embodiments, the step of comparing the first and second rim profiles comprises: calculating a cross-correlation between the first and second rim profiles, a maximum value of the cross-correlation being indicative of a likelihood of the first and second inspection images to have been acquired over the same optical-fiber connector.

In some embodiments, the method further comprises: activating a flag associated with the inspection images when a value of said maximum value is greater than a threshold.

In some embodiments, the step of determining further comprises: comparing image features identified in said first inspection image and said second inspection image.

In accordance with another aspect, there is provided a method for detecting inspection images of optical-fiber connector endfaces which are acquired on a same optical-fiber connector comprising:

receiving in a server application, a first inspection image and a second inspection image acquired by an optical-fiber connector endface inspection microscope, respectively associated with a first optical-fiber connector and a second optical-fiber connector, the optical-fiber connector link identified as different from said first optical-fiber connector;

the server application extracting a first rim profile from said first inspection image and a second rim profile from said second inspection image, the first and second rim profile being each extracted from a portion of the first and second inspection image that corresponds to a circumferential area of an optical fiber within the first and second inspection image;

the server application determining if the first and second inspection images are likely to have been acquired over the same optical-fiber connector at least from a comparison of the first and second rim profiles; and when said first and second inspection images that are identified as being acquired over different optical-fiber connector, are determined to be likely to have been acquired over the same optical-fiber connector, the server application activating a flag.

In accordance with yet another aspect, there is provided a method for detecting if inspection images of optical-fiber connector endfaces are acquired on a same optical-fiber connector, the method comprising:

receiving a first inspection image and a second inspection image;

extracting a first signature of optical-fiber connector endface from said first inspection image and a second signature of optical-fiber connector endface from said second inspection image; and determining if the first and second inspection images are likely to have been acquired over the same optical-fiber connector from a comparison of the first signature and second signature.

In some embodiments, the first signature comprises a first set of image features extracted from the first inspection image and the second signature comprises a second set of image features extracted from the second inspection image; and the step of determining comprises comparing the first and second sets of image features.

In other embodiments, the first signature comprises a first rim profile extracted from the first inspection image and the second signature comprises a second rim profile extracted from the second inspection image, the first and second rim profiles being each extracted from a portion of the first and second inspection images that corresponds to a circumferential area of an optical fiber within the first and second inspection images; and the step of determining comprises comparing the first and second rim profiles.

In accordance with yet another aspect, there is provided a method for detecting if inspection images of optical-fiber connector endfaces are acquired on a same optical-fiber connector, the method comprising:

receiving a first inspection image and a second inspection image;

extracting a first set of image features from said first inspection image and a second set of image features from said second inspection image; and determining if the first and second inspection images are likely to have been acquired over the same optical-fiber connector at least from a comparison of the first and second sets of image features.

In some embodiments, the method further comprises:

extracting a first rim profile from said first inspection image and a second rim profile from said second inspection image, the first and second rim profiles being each extracted from a portion of the first and second inspection images that corresponds to a circumferential area of an optical fiber within the first and second inspection images; and wherein the step of determining further comprises: comparing the first and second rim profiles.

In accordance with yet another aspect, there is provided a computer program comprising instructions that, when executed by a processor, cause the processor to perform any of the above described methods.

In accordance with still another aspect, there is provided a non-transitory computer-readable storage medium comprising instructions that, when executed, cause a processor to perform the steps of:

receiving a first inspection image and a second inspection image;

extracting a first rim profile from said first inspection image and a second rim profile from said second inspection image, the first and second rim profiles being each extracted from a portion of the first and second inspection images that corresponds to a circumferential area of an optical fiber within the first and second inspection images; and determining if the first and second inspection images are likely to have been acquired over the same optical-fiber connector at least from a comparison of the first and second rim profiles.

In accordance with still another aspect, there is provided a system for detecting if inspection images of optical-fiber connector endfaces are acquired on a same optical-fiber connector, comprising:

an optical-fiber connector endface inspection microscope device connectable to an inspected optical fiber connector for acquiring a first inspection image of the endface thereof;

a processing unit configured for:

receiving said first inspection image and a second inspection image;

extracting a first rim profile from said first inspection image and a second rim profile from said second inspection image, the first and second rim profiles being each extracted from a portion of the first and second inspection images that corresponds to a circumferential area of an optical fiber within the first and second inspection images; and determining if the first and second inspection images are likely to have been acquired over the same optical-fiber connector at least from a comparison of the first and second rim profiles.

For ease of reading, in the following description, the "optical-fiber connector endface inspection microscope" and the "optical-fiber connector endface inspection microscope system" may be referred to respectively as an "inspection microscope" and an "inspection microscope system". Similarly, the "optical-fiber connector endface" may be referred to as a "connector endface" or simply "endface".

In the present description, the terms "light" and "optical" are used to refer to radiation in any appropriate region of the electromagnetic spectrum. More particularly, the terms "light" and "optical" are not limited to visible light, but can include, for example, infrared or ultraviolet wavelength ranges. For example, in some embodiments, the illumination source can be embodied to emit light in the blue region, e.g., at about 470 nm, or any other suitable spectral region within the visible spectrum, the near ultraviolet spectrum or the near infrared spectrum. Those skilled in the art will understand, however, that these wavelength ranges are provided for illustrative purposes only and that the present techniques may operate beyond these ranges.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

Further features and advantages of the present invention will become apparent to those of ordinary skill in the art upon reading of the following description, taken in conjunction with the appended drawings.

BRIEF DESCRIPTION OF THE DRAWINGS

FIG. 6A, FIG. 6B and FIG. 6C are images illustrating the rim profile and extraction process as per Phase I of the algorithm of FIG. 5, wherein FIG. 6A represents the original inspection image as acquired, FIG. 6B represents a gradient image of the original inspection image, and FIG. 6C represents the original inspection image with added boundary lines defining three image zones;

FIG. 7A, FIG. 7B and FIG. 7C are images illustrating the image features extraction process as per Phase I of the algorithm of FIG. 5, wherein FIG. 7A represents the portion of the inspection image as acquired, within the inner zone, FIG. 7B represents a binary image resulting from applying a lower threshold on the image of FIG. 7A, and FIG. 7C represents a binary image resulting from applying an upper threshold on the image of FIG. 7A;

FIG. 8 is an image illustrating the image features as extracted from the image features extraction process illustrated in FIGS. 7A, 7B and 7C;

FIG. 11A, FIG. 11B, FIG. 11C and FIG. 11D are graphs illustrating a processing method to extract a rim profile from an inspection image, in accordance with one embodiment, wherein FIG. 11A represents the raw rim profile; FIG. 11B represents the rim profile as filtered using a low-pass filter; FIG. 11C represents a polynomial fit as applied on the filtered rim profile of FIG. 11B; and FIG. 11D represents a processed rim profile that is obtained by subtracting the polynomial fit from the filtered rim profile;

Figure 1:
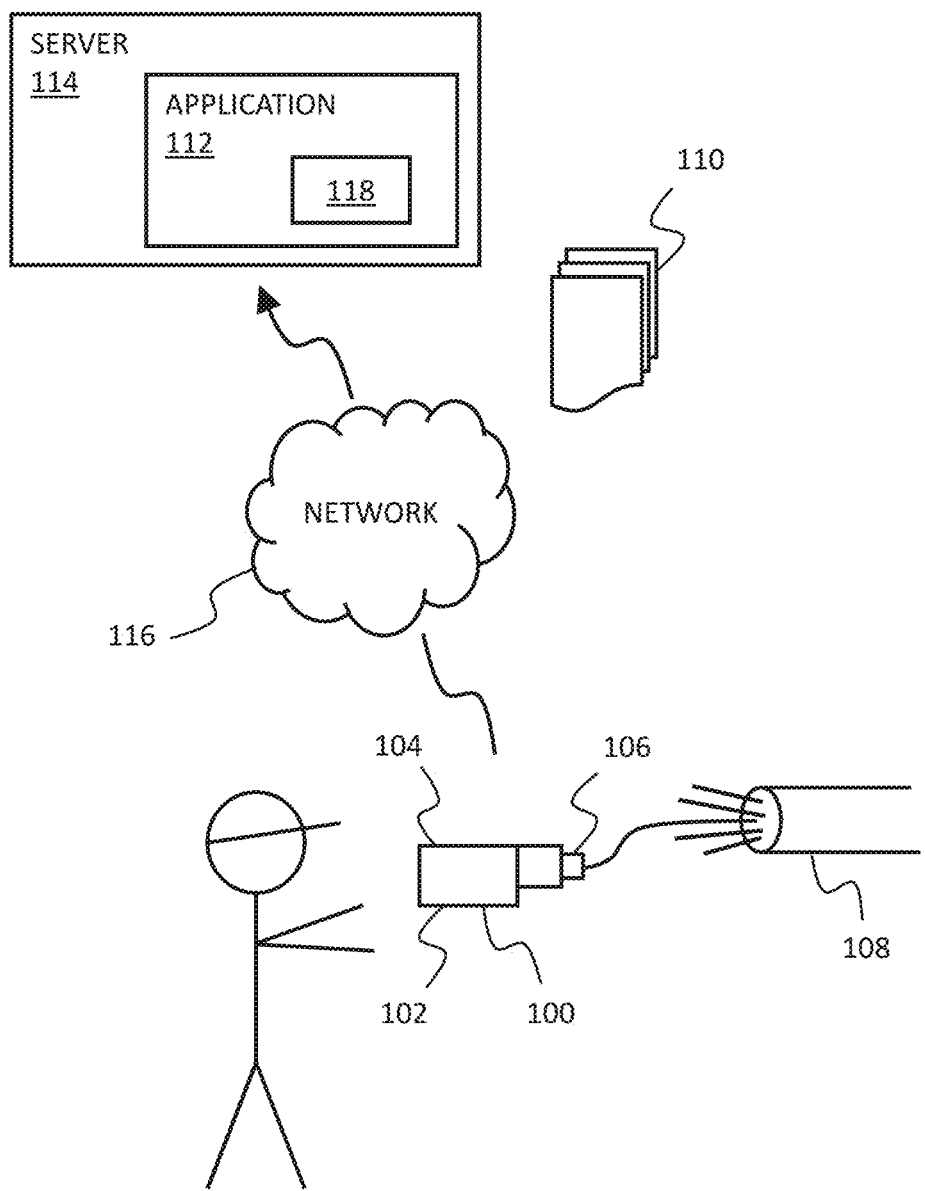
FIG. 1 is a schematic illustrating a server-based system embodying a method for detecting inspection images which are acquired on a same optical-fiber connector endface, in accordance with one embodiment.

It will be noted that throughout the drawings, like features are identified by like reference numerals. To not unduly encumber the figures, some elements may not be indicated in some figures if they were already identified in a preceding figure. It should be understood herein that elements of the drawings are not necessarily depicted to scale. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

FIG. 1 illustrates a server-based system involved in storing and/or accepting results of a test job executed, e.g., by a network operator worker or a subcontractor worker. The worker employs an optical-fiber connector endface inspection microscope device 100 (also referred to herein as the inspection microscope device 100) comprising an optical-fiber connector endface inspection microscope 102 (also referred to herein as the inspection microscope device 100) to inspect the endface of optical-fiber connectors 106 on a plurality of optical fibers, as required by the test job. For each optical-fiber connector 106 to be tested, the inspection microscope system 100 produces an inspection data file 110, which includes at least one inspection image that was acquired on the inspected optical-fiber connector endface and an identification index or string indicative of optical-fiber connector 106 being inspected. Of course, the inspection data file 110 may further include parameters of the optical-fiber connector 106 as derived from the acquired inspection images by an inspection image analysis module 104 that may be part of the inspection microscope device 100, such as, e.g., a pass/fail status, a number of defaults or the like.

Inspection data files 110 are transferred to a server-based test application 112 that cumulates the inspection data files 110 and may optionally track the progress and completion of the test job, accept and/or verify inspection data files 110. The test application 112 may be located on a server 114, which may or may not be cloud-based. The server 114 and the inspection microscope device 100 communicate over a network 116 such as, e.g. a computer network or the Internet. In some embodiments, a test report is prepared by the worker, e.g., via the inspection microscope device 100, and transferred to the test application 112 in addition to inspection data files 110 via the network 116. In other embodiments, a test report is prepared by the test application 112. In the context of installation or repair, the test report may further be required to complete a job and release payment by the network operator to the subcontractor.

In the illustrated case, the test job includes the characterization of many optical-fiber connectors 106 which are part of a same optical fiber cable 108. In such cases, a plurality of inspection data files 110 may therefore be transferred to the test application 112, and may be attached to the test report.

In the embodiment illustrated in FIG. 1, the test application 112 comprises a duplicate inspection detection module 118 which is used to detect whether some inspection images that are tagged as being performed over different optical-fiber connectors are likely to have been inadvertently or fraudulently acquired over the same optical-fiber connector. The duplicate inspection detection module 118 may be implemented in a test report verification application for example. In other embodiments, the duplicate inspection detection module 118 may be implemented directly in the inspection microscope device 100 to prevent mistakes in the field. In yet other embodiments, the duplicate inspection detection module 118 may be implemented in a test report verification application that is separate from the test application 112 and server 114, such as, e.g., a test report verification application controlled by the network operator and used to check and accept test reports received from subcontractors.

The method embodied by the duplicate inspection detection module 118 is now described with reference to FIGS. 2 to 12.

Each optical-fiber connector endface is likely to present some dirt, some scratches, or some other anomalies creating image features that are unique to a given optical-fiber connector. These image features may theoretically be used to detect images acquired on a same optical-fiber connector. However, fraudulent duplicates are more likely to occur on clean optical-fiber connectors presenting only small features that are considered acceptable (PASS status). This makes duplicate detection more difficult.

Figure 2A:
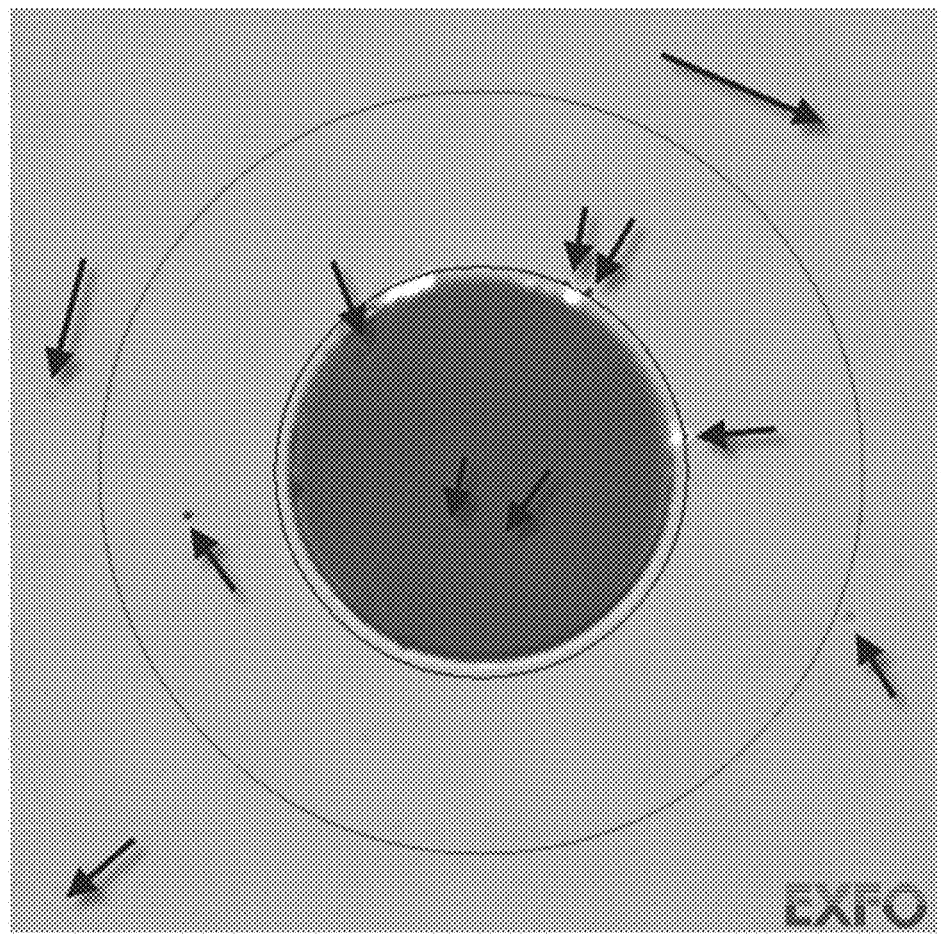
FIG. 2A is an image showing an example of an inspection image acquired from an optical-fiber connector endface and which highlights some image features (as pointed by black arrows)

FIG. 2A shows an example of an inspection image acquired from an optical-fiber connector endface and which shows (as pointed by the black arrows) some image features. The outer circle indicates the limit of the inspection area in which dirt, scratches and other anomalies are considered by the image analysis module 104 for evaluating the cleanliness and quality of the optical-fiber connector and determining the pass/fail status. Any dirt, scratches and other anomalies outside of the inspection area are disregarded in this cleanliness and quality evaluation. Nonetheless, in some embodiments, the visible features, including those outside the inspection area, may still be used in the duplicate inspection detection.

Because this optical-fiber connector endface is fairly clean and the anomalies present on the optical-fiber endface are fairly small within the inspection area, it is likely to pass the evaluation criteria and receive a PASS status. Fraudulent duplicates are more likely to occur on such clean optical-fiber connectors presenting few or even none of these features, which makes duplicate detection more difficult.

Figure 2B:
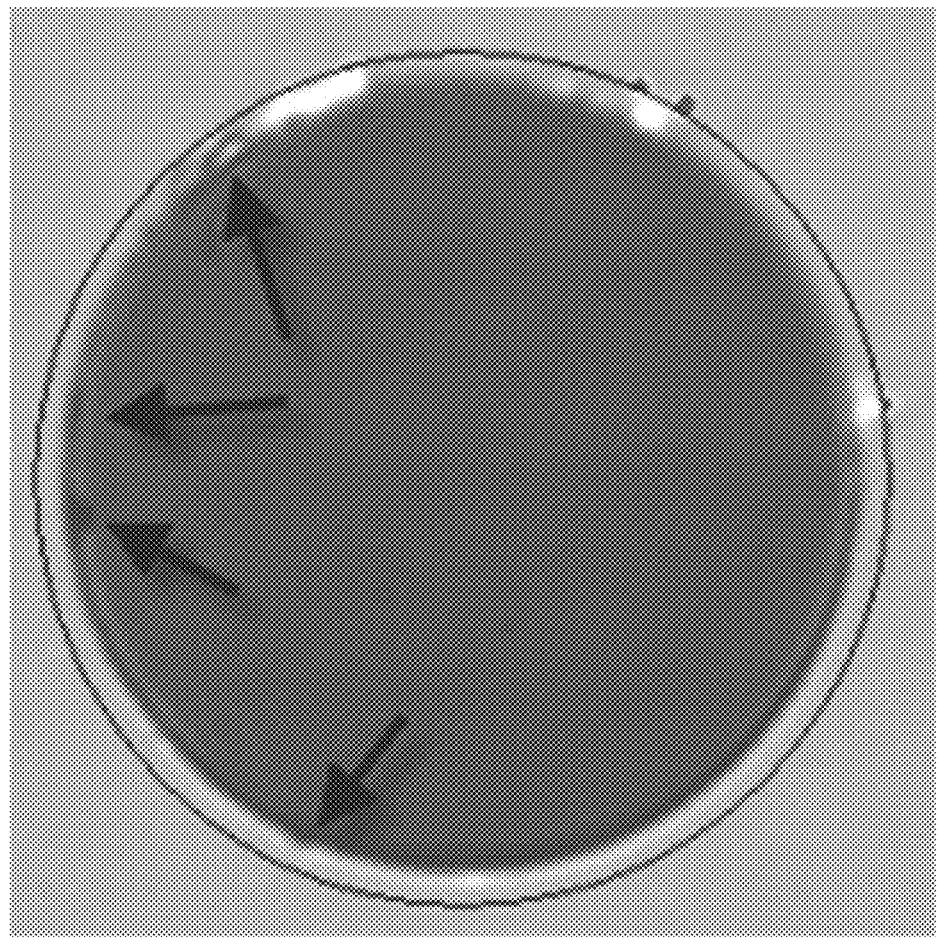
FIG. 2B is an image showing a zoom on the inspection image of FIG. 2A in which the rim zone surrounding the optical fiber is more visible and which highlights image features caused by adhesive and gaps within the rim zone (as pointed by red arrows)

FIG. 2B shows a zoom on the inspection image of FIG. 2A in which the rim zone surrounding the optical fiber is more visible and which shows features caused by adhesive and gaps within the rim zone (as pointed by the black arrows). The presence of gaps and/or adhesive in the rim zone is not considered as a defect of optical-fiber connectors. Therefore, in optical-fiber connector endface inspection, the rim zone is typically disregarded for assessing the cleanliness and quality of optical-fiber connector endfaces.

However, the adhesive and gaps within the rim zone create a unique signature of the optical-fiber connector endface. It creates a detectable pattern that can be used as a unique signature to compare images and detect duplicates.

Accordingly, in some embodiments, duplicate inspections are detected based on rim profiles extracted from the acquired optical-fiber connector endface inspection images, the rim profiles representing unique signatures of the optical-fiber connector endface. In some other embodiments, the duplicate inspections are detected by comparing both the rim profiles and image features (caused by dirt, scratches or anomalies) extracted from the inspection images.

Figure 3A:
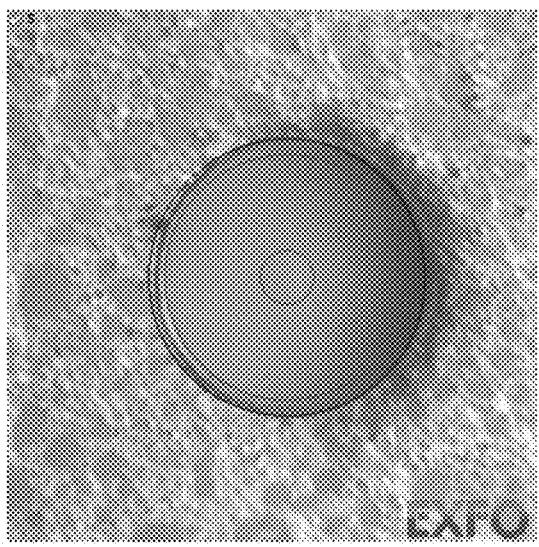
FIG. 3A and FIG. 3B are images showing examples of inspection images acquired on respective optical fibers of a multifiber optical-fiber connector endface.
Figure 3B:
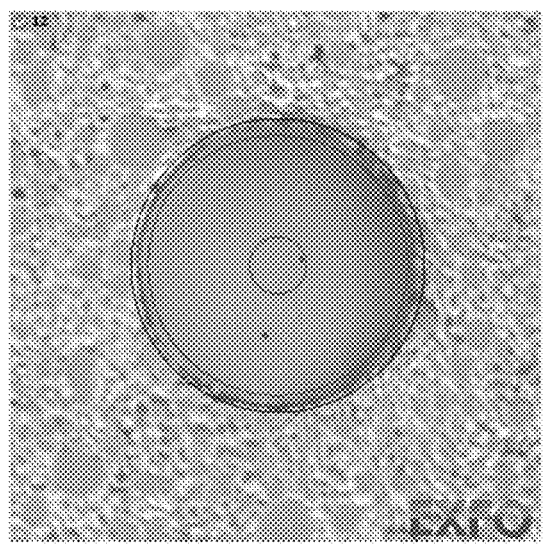

FIG. 3A and FIG. 3B show examples of inspection images acquired from a multifiber optical-fiber connector endface. The two inspection images were captured over two distinct optical fibers of the same multifiber optical-fiber connector. In a multifiber connector, usually comprising 12, 16, 24, 32 or more optical fibers, the optical fibers hold together with the help of a ferrule made of a plastic material. This material intrinsically present image features due to material structure, which are clearly visible on inspection images, outside of the circumferential area of the optical fiber. By their number, size, shape and position, these image features create a unique signature that may be used for comparing the inspection images to determine if inspection images of optical-fiber connector endfaces are acquired on a same optical-fiber connector.

Figure 4:
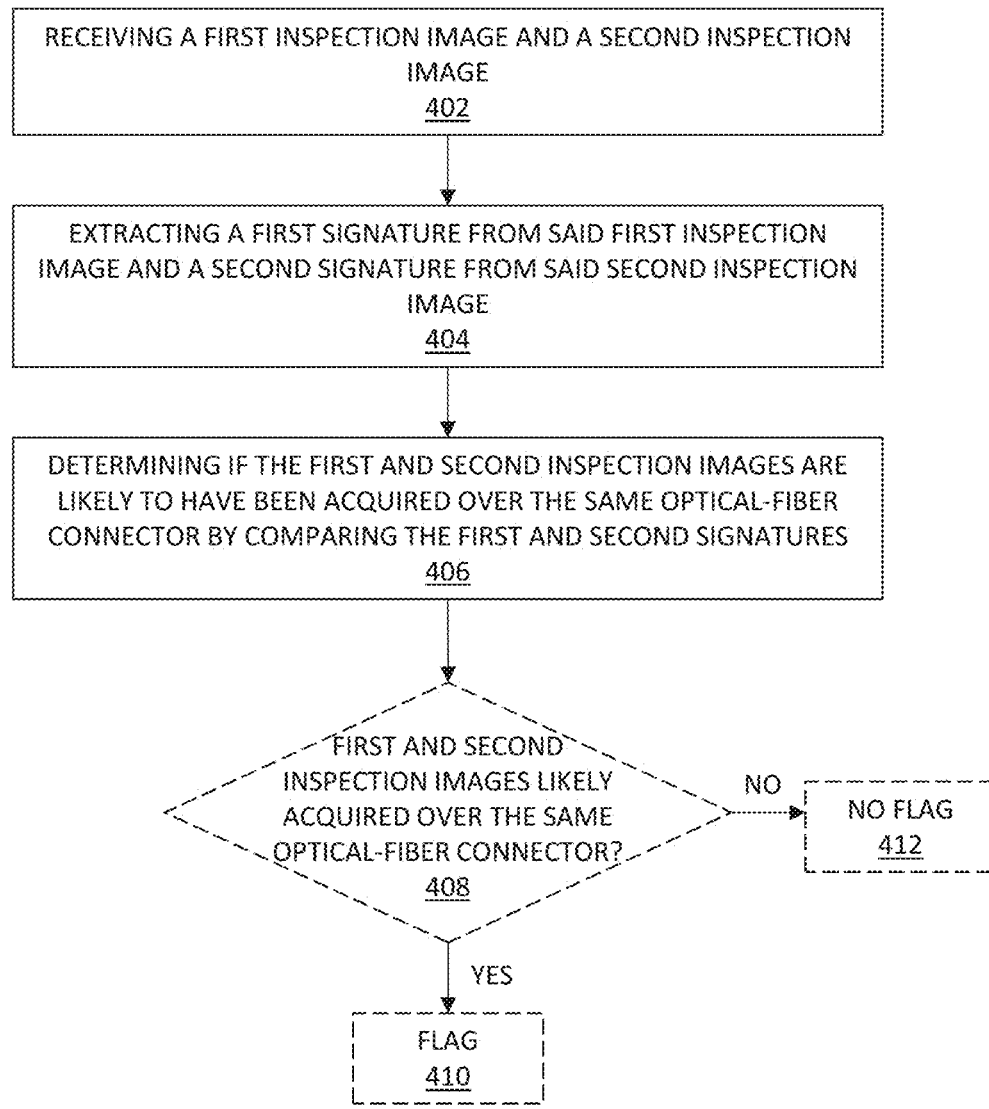
FIG. 4 is a flow chart illustrating a method for detecting inspection images which are acquired on a same optical-fiber connector endface, in accordance with one embodiment.

FIG. 4 illustrates a method for determining if inspection images of optical-fiber connector endfaces are acquired on a same optical-fiber connector, in accordance with one embodiment. The method of FIG. 4 may be embodied, e.g., in a duplicate inspection detection module 118, which may be implemented in a server application, in the inspection microscope device 100 or in any other test report verification application.

The method comprises step 402 of receiving a first inspection image and a second inspection image, respectively identified as being acquired over a first optical fiber connector and a second optical fiber connector, the second optical fiber connector optionally identified as different from the first optical fiber connector. As explained with reference to FIG. 1, each of the first and second inspection image may be received, e.g., as part of an inspection data file 110 and thereby tagged or indexed as being acquired over a given optical-fiber connector. In some embodiments, the inspection data files 110 may form part or be associated with a test report in response to a test job.

In step 404, a first signature is extracted from the first inspection image and a second signature is extracted from the second inspection image. A signature may comprise a rim profile extracted from a portion of the inspection images that corresponds to a circumferential area of an optical fiber within the inspection images, image features outside the circumferential area (in either or both the inner zone and the outer zone), or both a rim profile and image features. More specifically, as will be detailed hereinafter, first and second rim profiles may be extracted as one-dimensional functions $f_1(\Theta)$, $f_2(\Theta)$, i.e. as a function of an angular coordinate $\Theta$ with respect to the center of the optical fiber.

In one embodiment, the one-dimensional functions $f_1(\Theta)$, $f_2(\Theta)$ may represent the intensity of pixels along the rim with respect to the angular coordinate $\Theta$ and may be extracted as follows by analyzing the inspection image:
1) Determining the optical-fiber center position and diameter;
2) Defining boundaries that splits the inspection image in three areas: an inner zone (in the optical fiber), an outer zone (outside the optical fiber, i.e. in the ferrule) and a rim zone (circumferential area of the optical fiber) (see FIG. 6C);
3) Calculating the rim profile from pixels of the inspection image that are located within the fiber rim zone, e.g. by averaging, over the rim zone, pixels located along a radius from the optical-fiber center position, corresponding to each angular value G.

In another embodiment, the one-dimensional functions $f_1(\Theta)$, $f_2(\Theta)$ may represent the radial position $R_{max}$ of the maximum intensity with respect to the angular coordinate $\Theta$.

In yet other embodiments, the rim profiles may also be defined as two-dimensional functions $f_1(R, \Theta)$, $f_2(R, \Theta)$ of the angular coordinate $\Theta$ and the radius R within the rim zone. A two-dimensional function may also be implemented in cartesian coordinates (x,y). Finally, the rim profile may simply be defined as image features identified within the circumferential area, but it is found herein to be more robust and processing-efficient to extract a rim profile in the form of a one-dimensional function.

Image features corresponding to dirt, scratches and other anomalies may further be extracted by associating characteristics of position, size, greyscale level, major axis and minor axis to each extracted image feature. In the case of single-fiber connectors, images features located in either the inner or the outer zone may all be included in the signature. Optionally, e.g., in the case of multi-fiber connectors, the signature may only include image features located in the outer zone, which material intrinsically present image features due to material structure. Optionally, the amount of data saved in the database may be reduced by extracting image features using an algorithm such as canny edge detection and sparse matrix. The aim of such algorithm is to minimize the amount of data saved in the database for later image comparison, without necessarily extracting specific image features in the endface of the MPO image.

In step 406, it is determined if the first and second inspection images are likely to have been acquired over the same optical-fiber connector by comparing the first and second signatures. For example, a cross-correlation function between the first and second rim profiles may be calculated. A maximum value of the cross-correlation function, referred to as the correlation coefficient $C_{corr}$, may then be indicative of a likelihood of the first and second inspection images to have been acquired over the same optical-fiber connector. In other embodiments, signatures may be compared using peak detection or any other method of feature extraction in the rim profile such as, e.g., principal component analysis. Those extracted features can then be compared from one signature to another. These algorithms would provide the same information as extracted by the cross correlation (i.e. a number that qualifies the likeliness of duplicate and, optionally, an angle of rotation), by using features in the rim profile instead of the whole profile itself.

In one embodiment, the decision algorithm compares the correlation coefficient to a correlation threshold. The inspection images are determined to likely have been acquired over the same optical-fiber connector if the correlation coefficient is greater or equal to the correlation threshold, e.g., 0.5 or 0.7, and unlikely when the maximum value is lower than the correlation threshold.

It will be understood that for proper application of the correlation threshold, the cross-correlation function may need to be normalized in order to restrict possible values of cross-correlation function to a range extending between, e.g., −1 to 1.

Accordingly, the correlation coefficient $C_{corr}$ may be obtained as follows:

$$C_{corr} = \text{MAX}\left(\frac{(f_1 \star f_2)}{\sqrt{0.5 \cdot [\langle f_1, f_1 \rangle + \langle f_2, f_2 \rangle]}}\right)$$

wherein $(f_1 \star f_2)$ represents the cross-correlation operation between the first rim profile $f_1(\Theta)$ and the second rim profile $f_2(\Theta)$ and wherein $\langle f_1, f_1 \rangle$ represents the inner product of $f_1(\Theta)$, and $\langle f_2, f_2 \rangle$ represents the inner product of $f_2(\Theta)$.

The angular index of the maximum cross-correlation value also indicates the rotation angle $\Theta_{rot}$ between the two inspection images:

$$\theta_{rot} = \text{Argmax}\left(\frac{(f_1 \star f_2)}{\sqrt{0.5 \cdot [\langle f_1, f_1 \rangle + \langle f_2, f_2 \rangle]}}\right)$$

Then, optionally, in step 410, a flag associated with the inspection images, the test report or the test job is activated if the first and second inspection images that are identified as being acquired over different optical-fiber connector, are found to be likely to have been acquired over the same optical-fiber connector (step 408). Otherwise, in step 412, no flag is being activated.

The flag may take various forms such as a binary data field in a verification report associated with the digital test report, a text string or a numeric value added to a text test report, an exclamation mark icon or the like in a graphical user interface, a sound alert, etc. For example, in one embodiment, the flag may comprise a binary indicator of a likeliness (active if likely and inactive if unlikely) of the first and second inspection images to have been acquired over the same optical-fiber connector. In another embodiment, the flag may be indicative of a level of likeliness (e.g. low/ medium/high or on a scale of 1 to 10) of the first and second inspection images to have been acquired over the same optical-fiber connector.

In one embodiment, an alarm or an alert may be generated as a function of the number or the proportion of flags within a test job. For example, if many duplicates are found, an alarm may be raised or an alert message be generated (such as a text message, an email or an app notification, for example).

Figure 5:
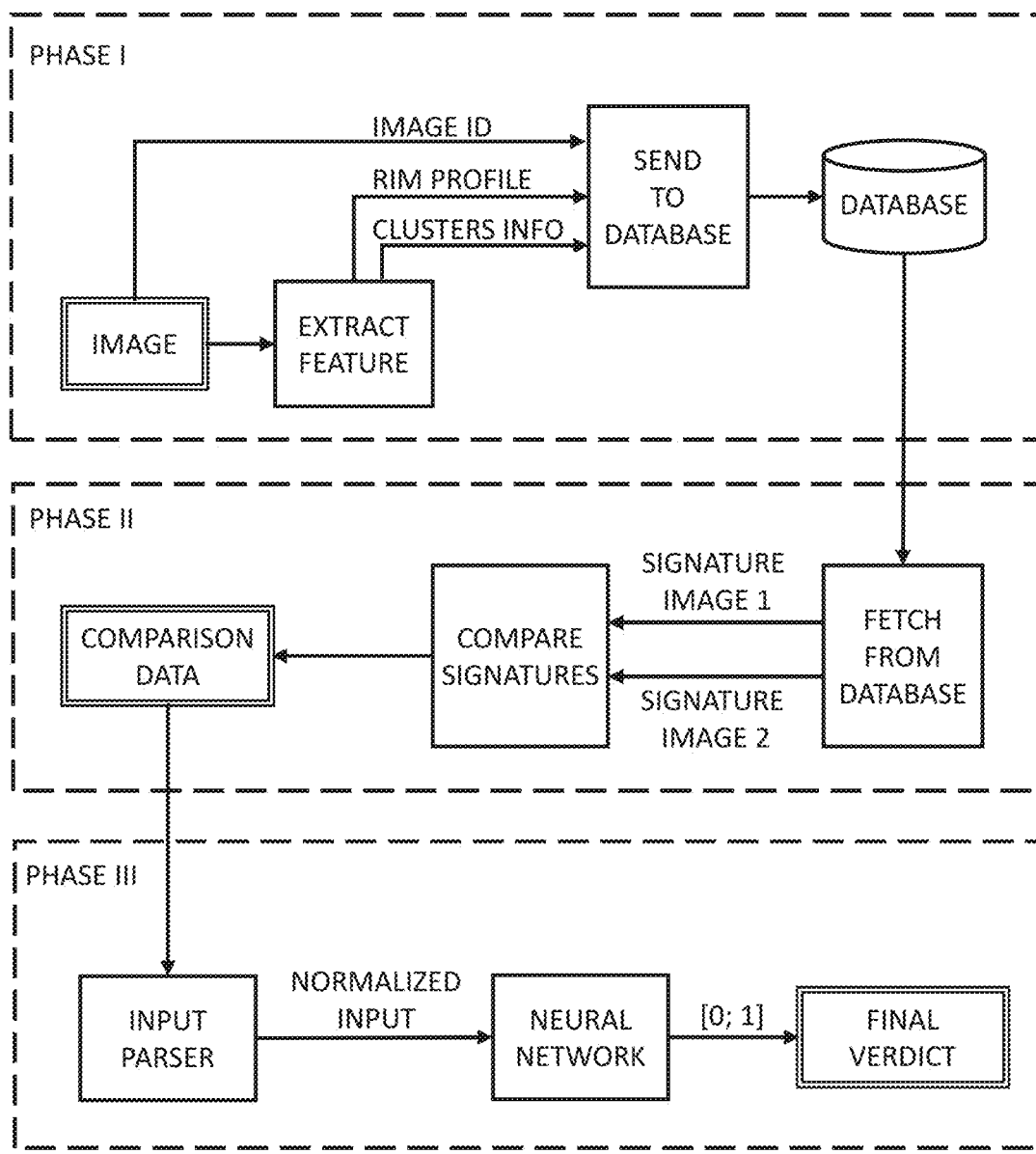
FIG. 5 is a flow chart illustrating an algorithm for detecting if inspection images were acquired on a same optical-fiber connector endface, in accordance with one embodiment.

Referring to FIG. 5, an example of an algorithm for detecting if inspection images of optical-fiber connector endfaces are acquired on a same optical-fiber connector is described. The described algorithm aims at assessing if two inspection images were acquired on the same optical-fiber connector endface or not, regardless of the rotation angle of the optical-fiber connector or the image illumination. The algorithm is divided into three phases. In Phase I, the algorithm extracts the rim profile and/or image features. The rim profile and image features as extracted may be saved in a database in the form of, e.g., a Comma-Separated Values (CSV) file, a Standard Database Format (SDF) file or any other proprietary or universal format. In Phase II, the algorithm accesses the database and compares the rim profile and/or image features of two inspection images to generate comparison parameters, including, e.g., the correlation coefficient $C_{corr}$ described hereinabove.

The rim profile has shown to be particularly useful in differentiating images when few or no dusts and scratches are present in an inspection image. In some embodiments, the detection may be based only on the rim profile. The algorithm may then end with a comparison of the correlation coefficient with a correlation threshold as described hereinabove. In other embodiments, the detection may be based solely on the image features, which may be useful in the case of multifiber optical-fiber connectors which intrinsically present strong image features due to material structure. In yet other embodiments, the detection may be based on both the rim profile and the image features, which is optimal for most single-fiber optical-fiber connectors.

Then, optionally, if image features are being employed in the algorithm, detection may further involve Phase III.

In Phase III, a balance of the comparison parameters is used to determine whether or not the inspection images are likely to have been acquired over the same optical-fiber connector. Phase III uses a decision algorithm which may use an artificial intelligence method, based or not on machine learning, in order to determine the degree of similarity between two images. Examples of such an artificial intelligence method are neural networks, support vector machines, decision trees, random forests and gaussian processes.

In the embodiment of FIG. 5, Phase III is based on a feedforward neural network trained to determine the degree of similarity (DoS) between two inspection images. The DoS as output by the neural network is a number between 0 and 1, where a DoS of 0 represents a total certainty that the inspection images are not coming from the same optical-fiber connector and a DoS of 1 means a total certainty that the inspection images are coming from the same optical-fiber connector.

Figure 6A:
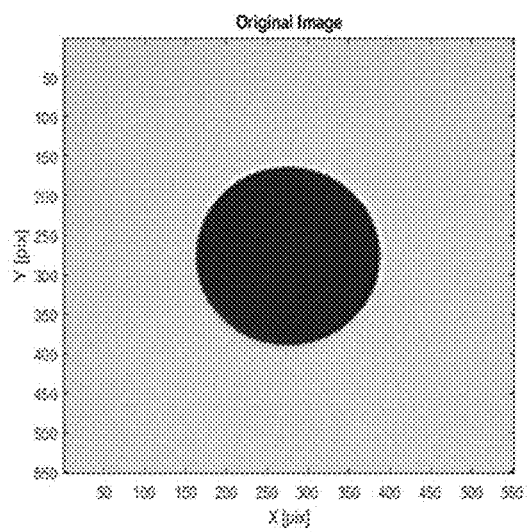
Figure 6B:
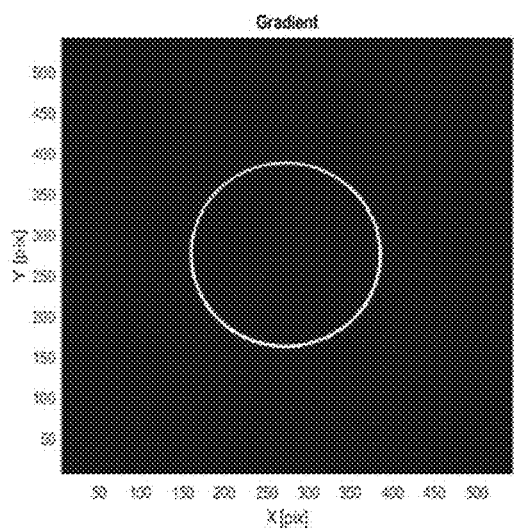
Figure 6C:
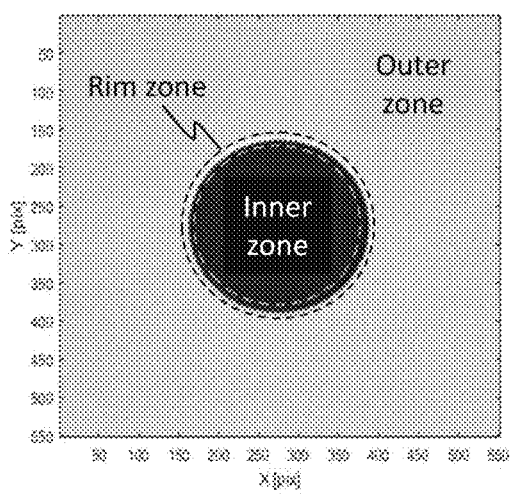

FIGS. 6A to 6C illustrates implementation details of the rim profile and image feature extraction process of Phase I, in accordance with one embodiment. To begin the extraction process, the reference point of the inspection image is established as the center of the optical fiber in the inspection image. In one embodiment, this can be done by 1) creating a gradient image of the original inspection image (see FIG. 6B); and 2) applying the Hough circle transform (HCT) on the gradient image.

The output of the HCT is the center position and radius ($R_{hough}$) of the best fitted circle in the gradient image. The center position of the circle is used as the origin point of the image, and the radius is used as a delimiter for defining three image zones as shown in FIG. 6C, i.e. the inner zone (inside the optical fiber), the outer zone (outside of the optical fiber), and the rim zone (circumferential area of the optical fiber). Table 1 shows an example mathematical definition of the three zones. Here, the rim zone is defined within a deviation of +1-20 pixels from the best fitted circle:

TABLE 1

| Delimiters of the zone in polar coordinate | |
|---|---|
| Zone | Definition (polar coordinate) |
| Inside | $r < R_{hough} - 20$ |
| Outside | $r > R_{hough} + 20$ |
| Rim | $R_{hough} - 20 < r < R_{hough} + 20$ |

Phase I may then extract the relevant image features to provide to the comparison algorithm of Phase II. To extract relevant image features from the inner and outer zones of the image, an adaptive threshold is used. This threshold-based method is simple of implementation, and low computationally demanding but, as one skilled in the art will understand, other methods may also be used.

Since the greyscale background level is not the same in each zone of the inspection image, the threshold level is adapted to fit those differences. For each image zone of interest, an upper and a lower threshold level ($T_{up}, T_{down}$) can be calculated as follows:

$$T_{up} = \mu_{zone} + N \cdot \sigma_{zone}$$

$$T_{down} = \mu_{zone} - N \cdot \sigma_{zone}$$

where $\mu_{zone}$ is the average value of the grayscale level over the relevant zone (inside or outside), $\sigma_{zone}$ is the standard deviation of the grayscale level within the relevant zone and N is an arbitrary constant such as, e.g. 3.0. Then, in the inspection image, the upper threshold is used to detect pixels that are brighter than the upper threshold and the lower threshold to detect pixels that are darker than the lower threshold. As shown in FIGS. 7A, 7B and 7C, the result of the threshold-based method is a binary image, i.e., composed of ones and zeros. Such a binary image is generated for each image zone. FIG. 7A shows the inspection image within the inner zone, wherein the grayscale was adjusted so as to better show image features present on the optical fiber. FIG. 7B shows the binary image resulting from applying the lower threshold. FIG. 7C shows the binary image resulting from applying the upper threshold.

A labelling algorithm is then applied to each of the binary images to identify image features, defined by pixel clusters, and calculate characteristics associated with each image features including, e.g., its angular coordinate, its radial distance with respect to the center of the optical fiber, its size, its mean grayscale level, its major axis and its minor axis. FIG. 8 shows the results of this process, where each cross indicates an extracted image feature.

Figure 9:
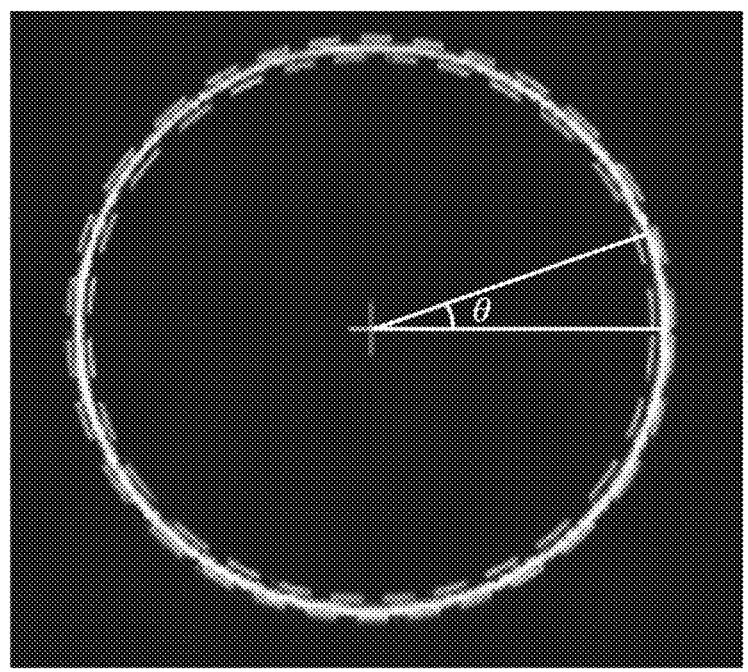
FIG. 9 is an image illustrating the limits of the rim zone used to extract a rim profile as well as the angular coordinate θ in a polar coordinate system.

Referring to FIG. 9, a rim profile may be extracted from the gradient image, using pixels located within the rim zone as identified from the above-described method, which corresponds to a circumferential area of an optical fiber within the inspection image (the limits of the rim zone are shown by broken-line circles in FIG. 9). The method consists in extracting values of pixels within the rim zone as a function of the angular coordinate θ in a polar coordinate system.

Figure 10:
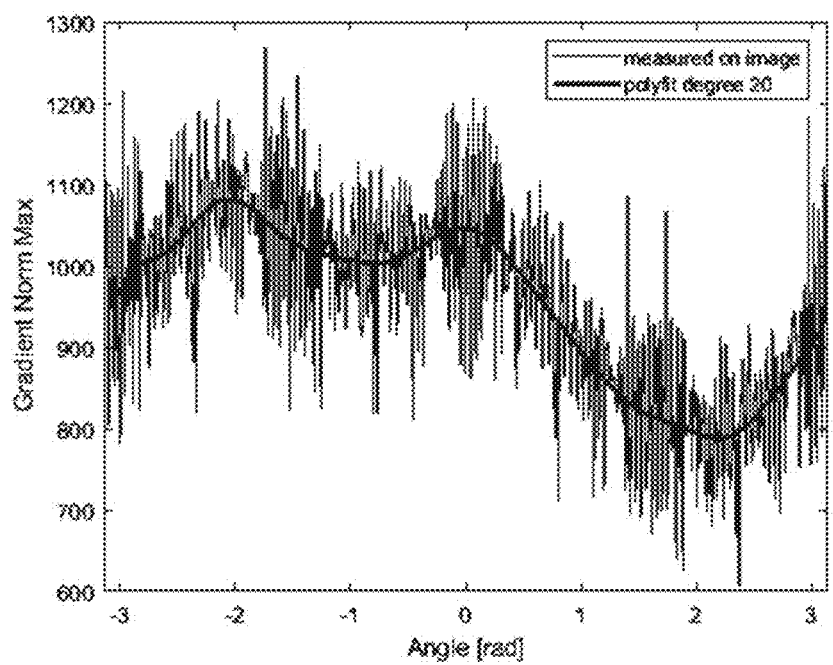
FIG. 10 is a graph illustrating a raw rim profile as extracted from an inspection image as well as a corresponding polynomial fit.

FIG. 10 shows a raw rim profile resulting from such process. As shown, the raw rim profile can be noisy. To mitigate the effect of the noise on eventual comparison method, a moving average filter may be applied to the raw rim profile.

Furthermore, some processing may be needed on the rim profile to remove a gradient in the rim profile that is caused by variation of the illuminating light used in the imaging process. An example embodiment of such processing is now described with reference to FIGS. 11A, 11B, 11C and 11D.

Figure 11A:
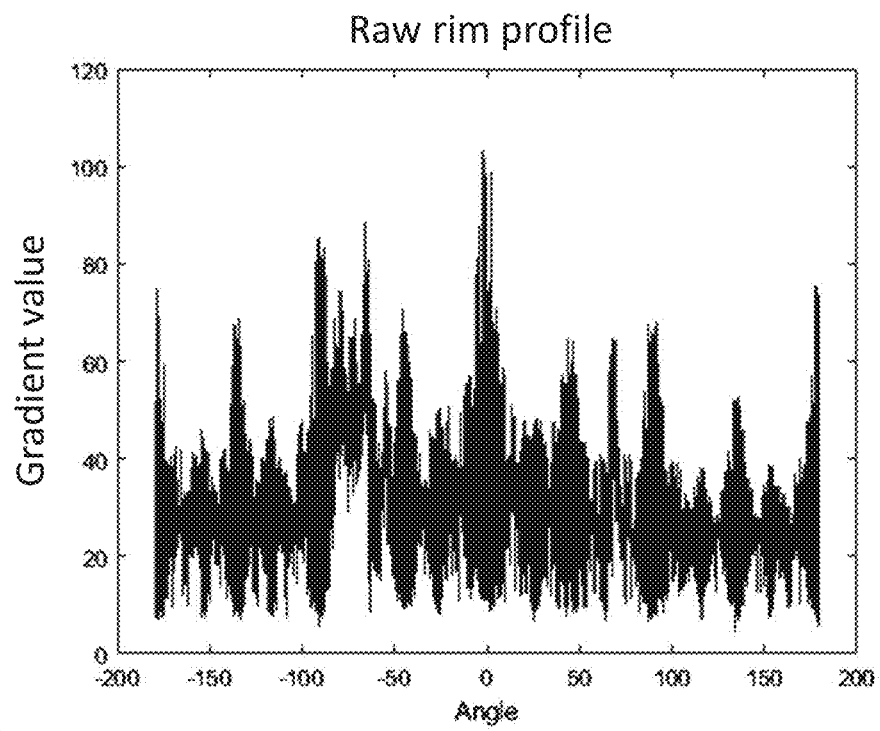
Figure 11B:
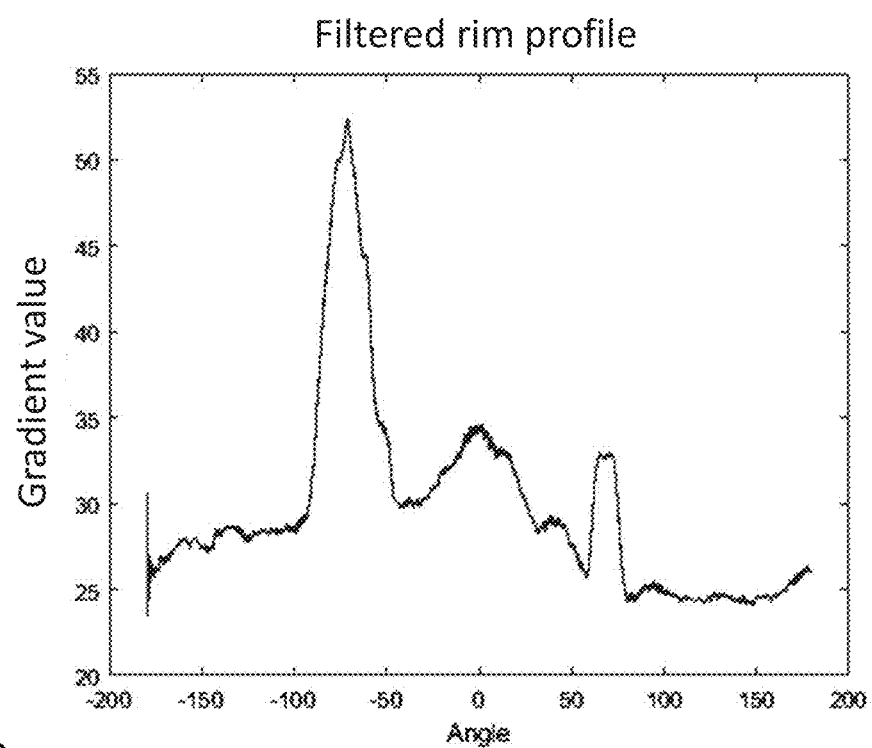

FIG. 11A shows an example raw profile. The first step is to apply a low-pass filter, such as, e.g. a moving average filter. The filtered rim profile is shown in FIG. 11B.

Figure 11C:
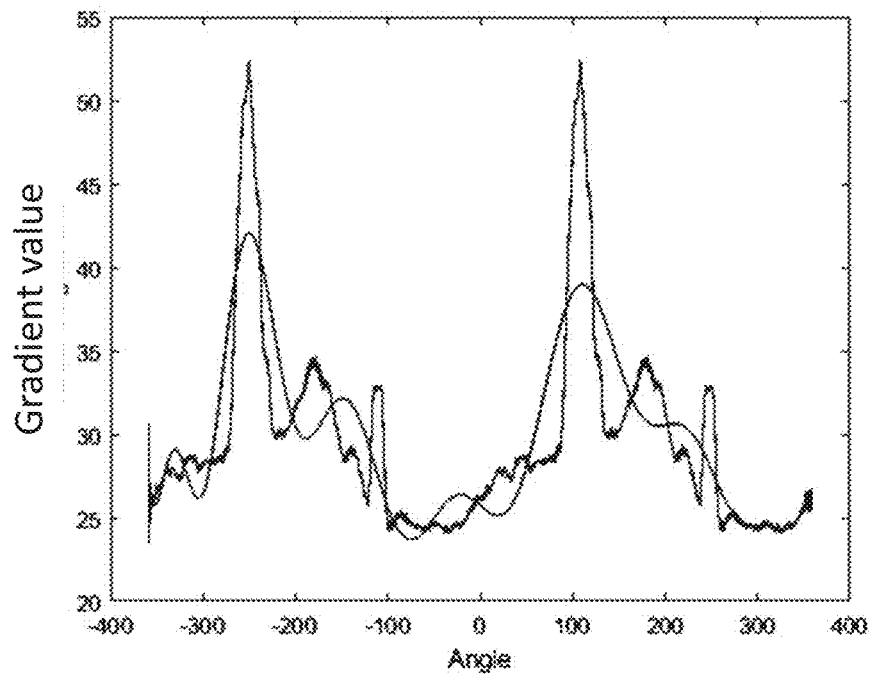
Figure 11D:
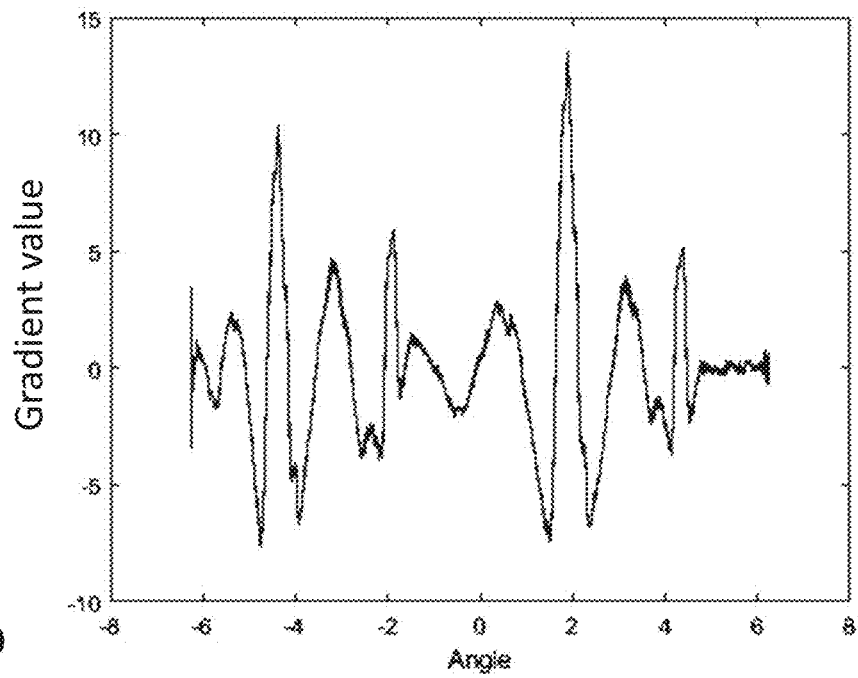

The second step is to remove the illuminating light effect. This can be done by a) fitting on the filtered rim profile, a polynomial expression, e.g., of the 20th order; and b) subtracting the result of the fit from the filtered rim profile. FIG. 11C shows the results of the fit over the filtered rim profile. It is noted that the rim profile may be duplicated so as to represent two complete revolutions about the optical fiber, in order to reduce artifacts generated at both ends of the profile. FIG. 11D shows the processed rim profile which is obtained by subtracting the fit from the filtered rim profile.

This processed rim profile is ready to be used to compare inspection images.

The results of Phase I is a data file comprising the rim profile and/or a list of image features and their associated characteristics. Each data file may be tagged with an identification number associated with the inspection image, which facilitates its tracking throughout the rest of the process. The data files may be saved in a database for further processing.

Back to FIG. 5, in Phase II, the rim profiles and the image features of two inspection images to be compared are pre-processed to produce parameters to be used for the decision phase of the algorithm.

As shown in FIG. 5, the algorithm first fetches from the database, the rim profile and the image features (referred to in FIG. 5 as the image signature) from both inspection images to be compared. To compare the rim profiles, the correlation coefficient is calculated as described hereinabove. As explained hereinabove, in some embodiments, the detection may be based only on the rim profile. The algorithm may then end with a comparison of the correlation coefficient with a correlation threshold as described hereinabove.

Optionally, if image features are being employed in the algorithm, the image features are compared in Phase II and the detection may further involve Phase III.

Figure 12:
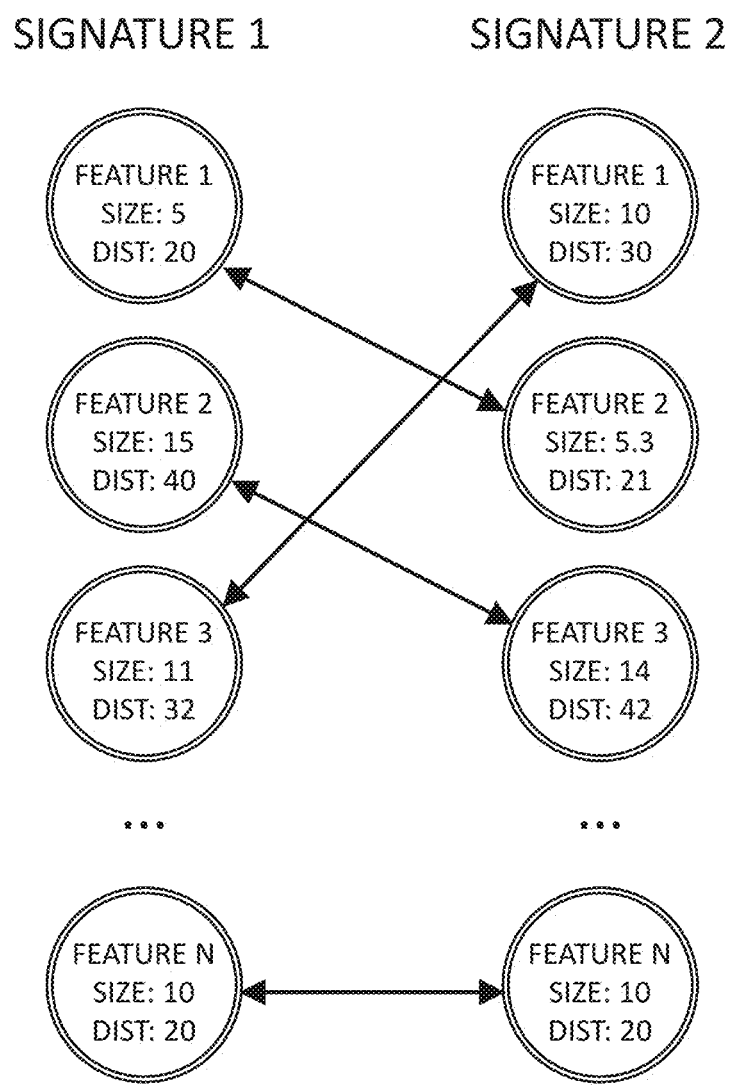
FIG. 12 is a graph illustrating an image feature pairing process used to compare the signatures of two inspection images.

Hence, if image features are being considered, in the comparison step in Phase II, image features from the compared inspection images are matched by pair so that image features from one inspection image are paired with matching image features from the other inspection image. As shown in FIG. 12, this may be performed by comparing characteristics of each image features such as their size, their radial distance from the center of the optical fiber, and optionally, their major axis and their minor axis, in order to choose, for each image feature of one inspection image, a "closest match" in the other inspection image, according to some criterion and tolerances.

Then, in Phase III, a balance of the comparison parameters is used to determine whether or not the inspection images are likely to have been acquired over the same optical-fiber connector. From the comparison parameters produced in Phase II, the input parser generates input values for the decision algorithm.

In one embodiment, those input values may comprise:
The number of corresponding image features found
The number of features found in one inspection image
The mean size of features in both inspection images
The root squared sum of the image feature size difference of each matched pair of image features $$S_{RSS} = \sqrt{\sum_i (S_{im1}^{(i)} - S_{im2}^{(i)})^2}$$

where index (i) designates the feature number, im1 designates the first image, im2 designates the second image and S designates the area of an image feature expressed, e.g., in pixel area or μm².

The root squared sum of the radial distance difference of each matched pair of image features $$R_{RSS} = \sqrt{\sum_i (R_{im1}^{(i)} - R_{im2}^{(i)})^2}$$

where index (i) designates the feature number, im1 designates the first image, im2 designates the second image and R designates the radial distance (in polar coordinates) from the center of the optical fiber, e.g., in pixel or μm.

The root squared sum of the angle coordinate difference of each matched pair of image features $$\theta_{RSS} = \sqrt{\sum_i (\theta_{im1}^{(i)} - \theta_{im2}^{(i)})^2}$$

where index (i) designates the feature number, im1 designates the first image, im2 designates the second image and θ designates the angular coordinate (polar coordinates) from the origin point as defined with reference to FIG. 9 expressed, e.g., in degrees or radiant.

The correlation coefficient between the two rim profiles

The angular index of the maximum cross-correlation between the two rim profiles

Those input values are fed to the decision algorithm which may be implemented, e.g., as a feedforward neural network that is trained to calculate, from the input values, a degree of similarity (DoS) between two inspection images. The neural network outputs a DoS that is a number between 0 and 1, where a DoS of 0 represents a total certainty that the inspection images are not coming from the same optical-fiber connector and a DoS of 1 means a total certainty that the inspection images are coming from the same optical-fiber connector.

Then, a verdict as to whether the two inspection images are likely to have been acquired over the same optical-fiber connector is obtained from the DoS. For example, in one embodiment, if the DoS is greater or equal to 0.7, the two inspection images are considered likely to have been acquired over the same optical-fiber connector.

Example of Computer System Architecture

Figure 13:
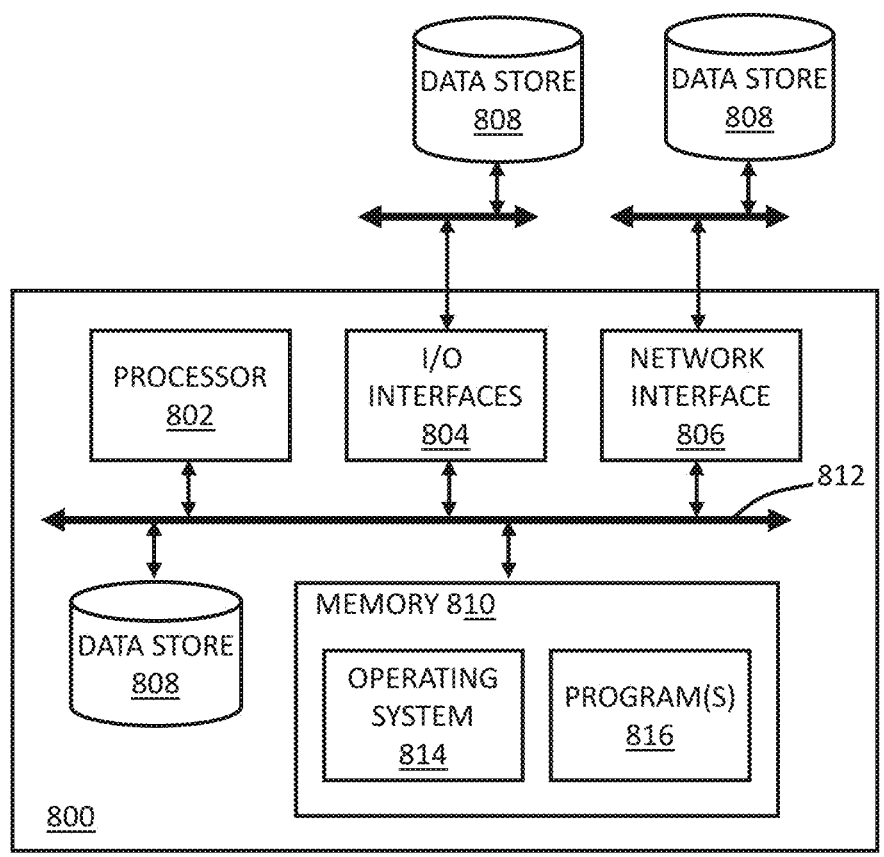
FIG. 13 is a block diagram illustrating an example architecture of a computer system embodying the server used to implement the server-based system of FIG. 1, in accordance with one embodiment.

Much of the software application that is used to implement the herein-described methods resides on and runs on a computer system, which in one embodiment, is a personal computer, workstation, or server. FIG. 13 is a block diagram of a computer system 800 which may embody, e.g., the server 114 used in to implement the server-based system of FIG. 1. In terms of hardware architecture, the computer system 800 generally includes a processor 802, input/output (I/O) interfaces 804, a network interface 806, a data store 808, and memory 810. It should be appreciated by those of ordinary skill in the art that FIG. 13 depicts the computer system 800 in a simplified manner, and a practical embodiment may include additional components and suitably configured processing logic to support known or conventional operating features that are not described in detail herein. A local interface 812 interconnects the major components. The local interface 812 may be, for example, but not limited to, one or more buses or other wired or wireless connections, as is known in the art. The local interface 812 may have additional elements, which are omitted for simplicity, such as controllers, buffers (caches), drivers, repeaters, and receivers, among many others, to enable communications. Further, the local interface 812 may include address, control, and/or data connections to enable appropriate communications among the aforementioned components.

The computer system 800 is controlled by the processor 802, which serves as the central processing unit (CPU) for the system. The processor 802 is a hardware device for executing software instructions. The processor 802 may comprise one or more processors, including central processing unit(s) (CPU), auxiliary processor(s) or generally any device for executing software instructions. When the computer system 800 is in operation, the processor 802 is configured to execute software stored within the memory 810, to communicate data to and from the memory 810, and to generally control operations of the computer system 800 pursuant to the software instructions. The I/O interfaces 804 may be used to receive user input from and/or for providing system output to one or more devices or components. The user input may be provided via, for example, a keyboard, touchpad, and/or a mouse. System output may be provided via a display device and a printer (not shown). I/O interfaces 804 may include, for example, a serial port, a parallel port, a Small Computer System Interface (SCSI), a Serial ATA (SATA), a fibre channel, Infiniband, iSCSI, a PCI Express interface (PCI-x), an Infrared (IR) interface, a Radio Frequency (RF) interface, a Universal Serial Bus (USB) interface, or the like.

The network interface 806 may be used to enable the computer system 800 to communicate over a computer network or the Internet. The network interface 806 may include, for example, an Ethernet card or adapter or a Wireless Local Area Network (WLAN) card or adapter. The network interface 806 may include address, control, and/or data connections to enable appropriate communications on the network. A data store 808 may be used to store data. The data store 808 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 808 may incorporate electronic, magnetic, optical, and/or other types of storage media. In one example, the data store 808 may be located internal to the computer system 800 such as, for example, an internal hard drive connected to the local interface 812 in the computer system 800. Additionally, in another embodiment, the data store 808 may be located external to the computer system 800 such as, for example, an external hard drive connected to the I/O interfaces 804 (e.g., SCSI or USB connection). In a further embodiment, the data store 808 may be connected to the computer system 800 through a network, such as, for example, a network attached file server.

The memory 810 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 810 may incorporate electronic, magnetic, optical, and/or other types of storage media. Note that the memory 810 may have a distributed architecture, where various components are situated remotely from one another, but can be accessed by the processor 802. The software in memory 810 may include one or more computer programs, each of which includes an ordered listing of executable instructions for implementing logical functions. The software in the memory 810 includes a suitable operating system (O/S) 814 and one or more computer programs 816. The operating system 814 essentially controls the execution of other computer programs, such as the one or more programs 816, and provides scheduling, input-output control, file and data management, memory management, and communication control and related services. The one or more programs 816 may be configured to implement the various processes, algorithms, methods, techniques, etc. described herein, such as duplicate detection.

It should be noted that the architecture of the computer system as shown in FIG. 13 is meant as an illustrative example only. Numerous types of computer systems are available and can be used to implement the computer system.

Example of Inspection Microscope Device Architecture

Figure 14:
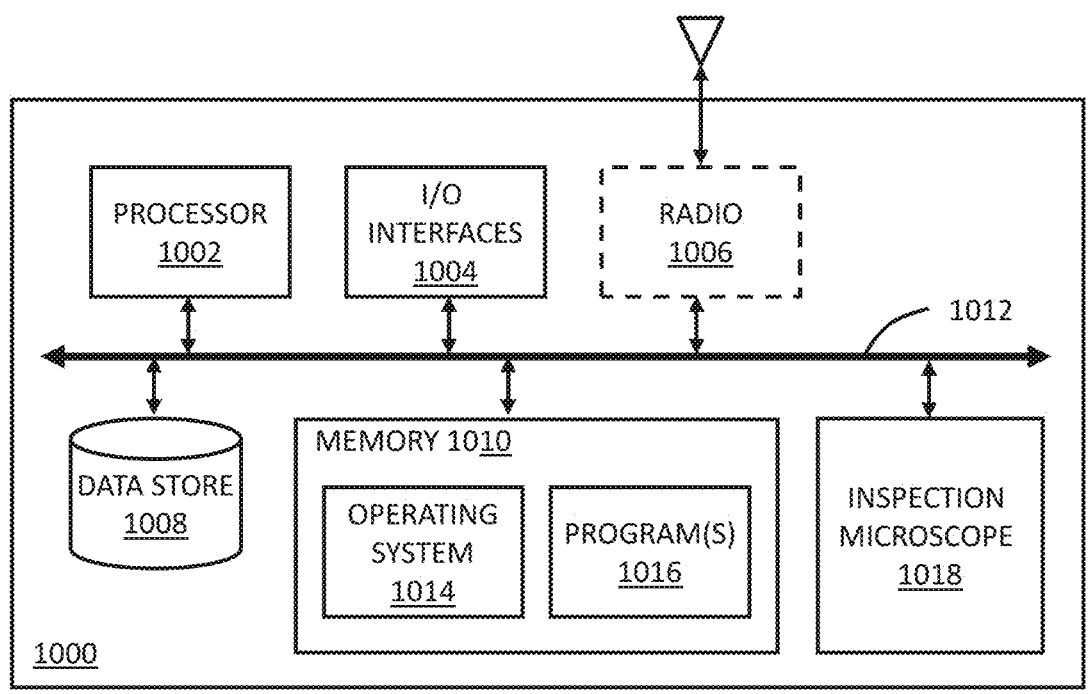
FIG. 14 is a block diagram illustrating an example architecture of an inspection microscope device of the system of FIG. 1.

FIG. 14 is a block diagram of an inspection microscope device 1000 which may embody the inspection microscope 102 of the system of FIG. 1. The inspection microscope device 1000 may comprise a digital device that, in terms of hardware architecture, generally includes a processor 1002, input/output (I/O) interfaces 1004, an optional radio 1006, a data store 1008, a memory 1010, as well as an optical test device including an inspection microscope 1018. It should be appreciated by those of ordinary skill in the art that FIG.

14 depicts the inspection microscope device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the inspection microscope device 1000 is in operation, the processor 1002 is configured to execute software stored within the memory 1010, to communicate data to and from the memory 1010, and to generally control operations of the inspection microscope device 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can optionally be used to display a graphical user interface (GUI) that enables a user to interact with the inspection microscope device 1000.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as inspection microscope images and inspection data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 14, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The programs 1016 may include various applications, add-ons, etc. configured to provide end-user functionality with the inspection microscope device 1000. For example, example programs 1016 may include a web browser to connect with a server for transferring inspection data files, a dedicated inspection microscope application configured to control inspections by the inspection microscope 1018, set inspection parameters and analyze inspection microscope images obtained by the inspection microscope 1018. For example, the dedicated inspection microscope application may embody an image analysis module configured to analyze acquired inspection images in order to characterize the optical-fiber connector under test, and produce inspection data files. The dedicated inspection microscope application may further embody a duplicate inspection detection module which embodies the duplicate detection method described herein.

It is noted that, in some embodiments, the I/O interfaces 1004 may be provided via a physically distinct handheld device (not shown), such as a handheld computer, a smartphone, a tablet computer, a laptop computer, a wearable computer or the like, e.g., communicatively coupled to the inspection microscope device 1000 via the radio 1006 or a wire connection to receive inspection images. In such cases, at least some of the programs 1016 may be located in a memory of such handheld device, for execution by a processor of the physically distinct device. The handheld device may then also include a radio and be used to transfer inspection data files toward a remote test application residing, e.g., on a server.

It should be noted that the inspection microscope device shown in FIG. 14 is meant as an illustrative example only. Numerous types of computer systems are available and can be used to implement the inspection microscope device.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The embodiments described above are intended to be exemplary only. The scope of the invention is therefore intended to be limited solely by the appended claims.

The invention claimed is:

1. A method for detecting if inspection images of optical-fiber connector endfaces are acquired on a same optical-fiber connector, the method comprising:
   receiving a first inspection image and a second inspection image;
   extracting a first rim profile from said first inspection image and a second rim profile from said second inspection image, the first and second rim profiles being each extracted from a portion of the first and second inspection images that corresponds to a circumferential area of an optical fiber within the first and second inspection images; and
   determining if the first and second inspection images are likely to have been acquired over the same optical-fiber connector at least from a comparison of the first and second rim profiles.

2. The method as claimed in claim 1, further comprising:
   activating a flag associated with the inspection images when said first and second inspection images are likely to have been acquired over the same optical-fiber connector.

3. The method as claimed in claim 1, wherein the first and the second rim profiles as extracted are one-dimensional functions.

4. The method as claimed in claim 3, wherein the step of comparing the first and second rim profiles comprises: calculating a cross-correlation between the first and second rim profiles, a maximum value of the cross-correlation being indicative of a likelihood of the first and second inspection images to have been acquired over the same optical-fiber connector.

5. The method as claimed in claim 4, further comprising: activating a flag associated with the inspection images when a value of said maximum value is greater than a threshold.

6. The method as claimed in claim 1, wherein the step of determining whether the first and second inspection images are likely to have been acquired over the same optical-fiber connector comprises comparing image features identified in said first inspection image and said second inspection image.

7. A method for detecting if inspection images of optical-fiber connector endfaces are acquired on a same optical-fiber connector, the method comprising:
   receiving a first inspection image and a second inspection image;
   extracting a first signature of optical-fiber connector endface from said first inspection image and a second signature of optical-fiber connector endface from said second inspection image; and
   determining if the first and second inspection images are likely to have been acquired over the same optical-fiber connector from a comparison of the first signature and second signature.

8. The method as claimed in claim 7,
   wherein the first signature comprises a first set of image features extracted from the first inspection image and the second signature comprises a second set of image features extracted from the second inspection image, and
   wherein the step of determining comprises comparing the first and second sets of image features.

9. The method as claimed in claim 7,
   wherein the first signature comprises a first rim profile extracted from the first inspection image and the second signature comprises a second rim profile extracted from the second inspection image, the first and second rim profiles being each extracted from a portion of the first and second inspection images that corresponds to a circumferential area of an optical fiber within the first and second inspection images; and
   wherein the step of determining comprises comparing the first and second rim profiles.

10. A non-transitory computer-readable storage medium comprising instructions that, when executed, cause a processor to perform the steps of:
    receiving a first inspection image and a second inspection image;
    extracting a first rim profile from said first inspection image and a second rim profile from said second inspection image, the first and second rim profiles being each extracted from a portion of the first and second inspection images that corresponds to a circumferential area of an optical fiber within the first and second inspection images; and
    determining if the first and second inspection images are likely to have been acquired over the same optical-fiber connector at least from a comparison of the first and second rim profiles.

11. The non-transitory computer-readable storage medium as claimed in claim 10, further comprising instructions that, when executed, cause a processor to perform the steps of: activating a flag associated with the inspection images when said first and second inspection images are likely to have been acquired over the same optical-fiber connector.

12. The non-transitory computer-readable storage medium as claimed in claim 10, wherein the first and the second rim profiles as extracted are one-dimensional functions.

13. The non-transitory computer-readable storage medium as claimed in claim 12, wherein the step of comparing the first and second rim profiles comprises: calculating a cross-correlation between the first and second rim profiles, a maximum value of the cross-correlation being indicative of a likelihood of the first and second inspection images to have been acquired over the same optical-fiber connector.

14. The non-transitory computer-readable storage medium as claimed in claim 13, further comprising instructions that, when executed, cause a processor to perform the steps of: activating a flag associated with the inspection images when a value of said maximum value is greater than a threshold.

15. The non-transitory computer-readable storage medium as claimed in claim 10, wherein the step of determining further comprises: comparing image features identified in said inspection image and said second inspection image, outside of said circumferential area.

16. A system for detecting if inspection images of optical-fiber connector endfaces are acquired on a same optical-fiber connector, comprising:
   an optical-fiber connector endface inspection microscope device connectable to an inspected optical fiber connector for acquiring a first inspection image of the endface thereof;
   a processing unit configured for:
      receiving said first inspection image and a second inspection image;
      extracting a first rim profile from said first inspection image and a second rim profile from said second inspection image, the first and second rim profiles being each extracted from a portion of the first and second inspection images that corresponds to a circumferential area of an optical fiber within the first and second inspection images; and
      determining if the first and second inspection images are likely to have been acquired over the same optical-fiber connector at least from a comparison of the first and second rim profiles.

17. The system as claimed in claim 16, wherein the processing unit is further configured for: activating a flag associated with the inspection images when said first and second inspection images are likely to have been acquired over the same optical-fiber connector.

18. The system as claimed in claim 16, wherein the processing unit is further configured for extracting the first and the second rim profiles as one-dimensional functions.

19. The system as claimed in claim 18, wherein the processing unit is further configured for: calculating a cross-correlation between the first and second rim profiles, a maximum value of the cross-correlation being indicative of a likelihood of the first and second inspection images to have been acquired over the same optical-fiber connector.

20. The system as claimed in claim 19, wherein the processing unit is further configured for: activating a flag associated with the inspection images when a value of said maximum value is greater than a threshold.

21. The system as claimed in claim 16, wherein the processing unit is further configured for: comparing image features identified in said first inspection image and said second inspection image, outside of said circumferential area to determine if the first and second inspection images are likely to have been acquired over the same optical-fiber connector.

22. The system as claimed in claim 16, wherein the said first inspection image and a second inspection image are received in a server application, the server application extracting the first and second rim profiles and determining if the first and second inspection images are likely to have been acquired over the same optical-fiber connector, and wherein, when said first and second inspection images that are identified as being acquired over different optical-fiber connectors, are determined to be likely to have been acquired over the same optical-fiber connector, the server application activating a flag.

23. The method as claimed in claim 6, further comprising:
   extracting a first set of image features from said first inspection image and a second set of image features from said second inspection image; and
   determining if the first and second inspection images are likely to have been acquired over the same optical-fiber connector at least from a comparison of the first and second sets of image features.

* * * * *